United States Patent
Proca (10) Patent No.: US 8,643,742 B2
(45) Date of Patent: Feb. 4, 2014

(54) CROSSTALK FILTER IN A DIGITAL IMAGE PROCESSING PIPELINE

(75) Inventor: Adrian Proca, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 459 days.

(21) Appl. No.: 12/905,947

(22) Filed: Oct. 15, 2010

(65) Prior Publication Data

US 2012/0092520 A1  Apr. 19, 2012

(51) Int. Cl.
*H04N 9/73* (2006.01)

(52) U.S. Cl.
USPC ........................................................ 348/223.1

(58) Field of Classification Search
None
See application file for complete search history.

(56) References Cited

U.S. PATENT DOCUMENTS

| | | | |
|---|---|---|---|
| 6,757,012 B1* | 6/2004 | Hubina et al. | 348/222.1 |
| 7,015,962 B2* | 3/2006 | Acharya | 348/273 |
| 7,561,194 B1* | 7/2009 | Luo | 348/241 |
| 7,688,362 B2* | 3/2010 | Glenn | 348/235 |
| 7,826,656 B2* | 11/2010 | Chiu | 382/162 |
| 8,054,352 B2* | 11/2011 | Kim et al. | 348/280 |
| 2003/0214594 A1* | 11/2003 | Bezryadin | 348/280 |
| 2006/0170942 A1* | 8/2006 | Chiba | 358/1.9 |

* cited by examiner

*Primary Examiner* — Luong T Nguyen (74) *Attorney, Agent, or Firm* — Patterson & Sheridan, LLP (57) ABSTRACT

A technique for applying a crosstalk filter to raw image sensor data in a digital image processing pipeline is disclosed. Raw image sensor data generated by an image sensor, where each pixel in the raw image sensor data includes an intensity value for only a single color channel of a plurality of possible color channels, is processed in the digital image processing pipeline. For each pixel of the raw image sensor data, a corrected intensity value is computed based on intensity values associated with one or more additional pixels of the raw image sensor data that neighbor the pixel.

12 Claims, 6 Drawing Sheets

| 401 RGB | 402 RGB | 403 RGB | 404 RGB | 405 RGB | 406 RGB |
|---|---|---|---|---|---|
| 411 RGB | 412 RGB | 413 RGB | 414 RGB | 415 RGB | 416 RGB |
| 421 RGB | 422 RGB | 423 RGB | 424 RGB | 425 RGB | 426 RGB |
| 431 RGB | 432 RGB | 433 RGB | 434 RGB | 435 RGB | 436 RGB |
| 441 RGB | 442 RGB | 443 RGB | 444 RGB | 445 RGB | 446 RGB |
| 451 RGB | 452 RGB | 453 RGB | 454 RGB | 455 RGB | 456 RGB |

CROSSTALK FILTER IN A DIGITAL IMAGE PROCESSING PIPELINE

BACKGROUND OF THE INVENTION

1. Field of the Invention

The invention relates generally to the field of digital image processing and, more specifically, to a crosstalk filter in a digital image processing pipeline.

2. Description of the Related Art

Digital cameras typically include an image sensor with an integrated color filter array, such as a Bayer filter mosaic. The image sensors generate raw image sensor data where each pixel location in the raw image sensor data stores the intensity of light corresponding to a particular color channel. A well-known problem with such image sensors is that spectral, optical and electrical crosstalk between neighboring pixel locations causes poor color separation and a reduction of spatial resolution in the resulting digital image. These effects are caused by light hitting one pixel location that then generates an intensity value across multiple adjacent pixel locations.

To correct for the poor color separation arising from crosstalk, many digital image processing pipelines implement a color correction processing block. In such implementations, color correction processing is performed on pixel data in a digital image after the raw data captured by the image sensor has been interpolated through a process called demosaicing. With demosaicing, each pixel location in the digital image stores an intensity value for each of three distinct color channels (red, green, and blue).

One drawback of performing color correction after demosaicing is that the reduction in spatial resolution caused by crosstalk cannot be corrected. Color correction processing is performed on each individual pixel location independently of that pixel location's neighboring pixel locations, so there is no adjustment of the color intensity values associated with the pixel location based on the color intensity values stored in the neighboring pixel locations.

As the foregoing illustrates, what is needed in the art is an improved approach for correcting for the effects of spectral, optical and electrical crosstalk in digital images.

BRIEF DESCRIPTION OF THE FIGURES

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of any of the example embodiments may be incorporated in other embodiments without further recitation.

DETAILED DESCRIPTION

In the following description, numerous specific details are set forth to provide a more thorough understanding of various embodiments of the invention. However, it will be apparent to one of skill in the art that certain embodiments of the invention may be practiced without one or more of these specific details. In other instances, well-known features have not been described in order to avoid obscuring the invention.

Overview

One embodiment of the present invention sets forth a method for applying a crosstalk filter to raw image sensor data. The method includes the step of receiving an array of pixel data that is generated by an image sensor, where each pixel location in the array of pixel data includes an intensity value for only a single color channel of a plurality of possible color channels and, for each pixel location in the array of pixel data, computing a corrected intensity value based on intensity values associated with one or more additional pixel locations that neighbor the pixel location.

Description of Figures

Figure 1:
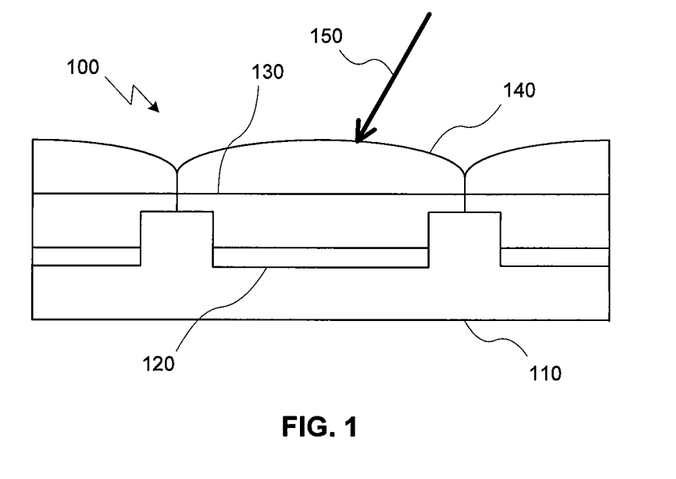
FIG. 1 illustrates an image sensor, according to one example embodiment of the invention.

FIG. 1 illustrates an image sensor 100, according to one example embodiment of the invention. Image sensor 100 may be a charge coupled device (CCD) or a complementary metal oxide semiconductor (CMOS) pixel sensor. As shown, image sensor 100 may include a silicon substrate 110 that includes a pixel location 120. Pixel location 120 collects charge proportional to the number of photons that strike the photosensitive area of pixel location 120. Located above pixel location 120 is a color filter 130 that allows photons with a wavelength in a specific region of visible light to pass through. Without color filter 130, pixel location 120 would generate a voltage based on the amount of photons of every wavelength that strike the photosensitive area of pixel location 120. With color filter 130, pixel location 120 is configured to generate a voltage that is proportional to the intensity of visible light corresponding to the frequency pass band of the given color filter 130 that strikes the photosensitive area of pixel location 120. Microlens 140 is located above color filter 130 and focuses photons 150 towards the photosensitive area of pixel location 120. Image sensor 100 may include integrated circuit components (not shown) built into silicon substrate 110 around the perimeter of pixel location 120.

Image sensor 100 includes a two-dimensional array of pixel locations arranged on silicon substrate 110. Image sensors suffer from a well-known problem due to spectral, optical and electrical crosstalk. Spectral crosstalk occurs when sub-optimal color filters allow some amount of light corresponding to a different color channel to pass through. Optical crosstalk occurs when a photon that should strike pixel location 120 strikes a neighboring pixel location instead. This may happen when photon 150 strikes micro-lens 140 at an incident angle that allows photon 150 to travel to a neighboring pixel location. Electrical crosstalk occurs when charge built up in pixel location 120 causes a charge to build up, through electromagnetic interference (EMI), at a neighboring pixel location. Crosstalk results in a shift in the spectral response of the image sensor 100 and a reduction in spatial resolution.

Figure 2:
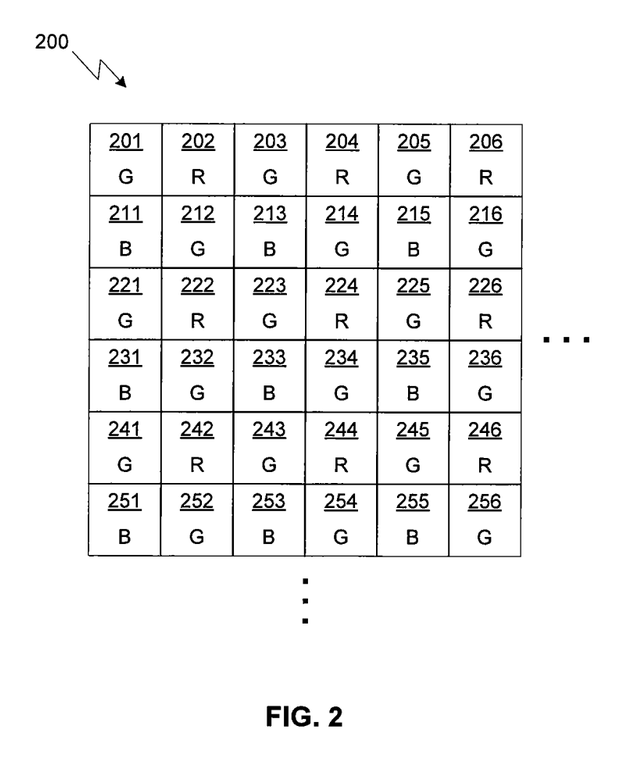
FIG. 2 illustrates raw image sensor data captured with the image sensor of FIG. 1, according to one example embodiment of the invention.

FIG. 2 illustrates raw image sensor data 200 captured with the image sensor 100 of FIG. 1, according to one example embodiment of the invention. The Bayer mosaic pattern integrates color filters corresponding to three separate color channels into the image sensor 100 to generate intensity values for each pixel location corresponding to a red color channel, a green color channel, or a blue color channel. Each pixel location of image sensor 100 stores an intensity of light for one of the three color channels. The pixel locations (201, 202, etc.) of raw image sensor data 200 are arranged such that each 2×2 block of pixel locations corresponds to two intensity values of a green color channel as well as one intensity value of a red color channel and one intensity value of a blue color channel. As shown in FIG. 2, the top row of pixel locations in raw image sensor data 200 includes pixel locations 201, 202, 203, 204, 205, 206, etc. Pixel locations 201, 203, and 205 each store an intensity value corresponding to the green color channel. Pixel locations 202, 204, and 206 each store an intensity value corresponding to the red color channel. The next row of pixel locations includes pixel locations 211, 212, 213, 214, 215, 216, etc. Pixel locations 211, 213, and 215 each store an intensity value corresponding to the blue color channel. Pixel locations 212, 214, and 216 each store an intensity value corresponding to the green color channel. The remaining pixel locations (221, 222, etc.) are arranged in a repeating pattern similar to the first and second rows of pixel locations.

Each pixel location (200, 201, etc.) in raw image sensor data 200 stores an intensity value for one of the three color channels of a digital image generated by the image sensor 100. In order to generate a digital image in an RGB format (where each pixel location stores an intensity value for each of the red, green, and blue color channels), the raw image sensor data 200 is processed by a digital image processing pipeline 300.

Figure 3:
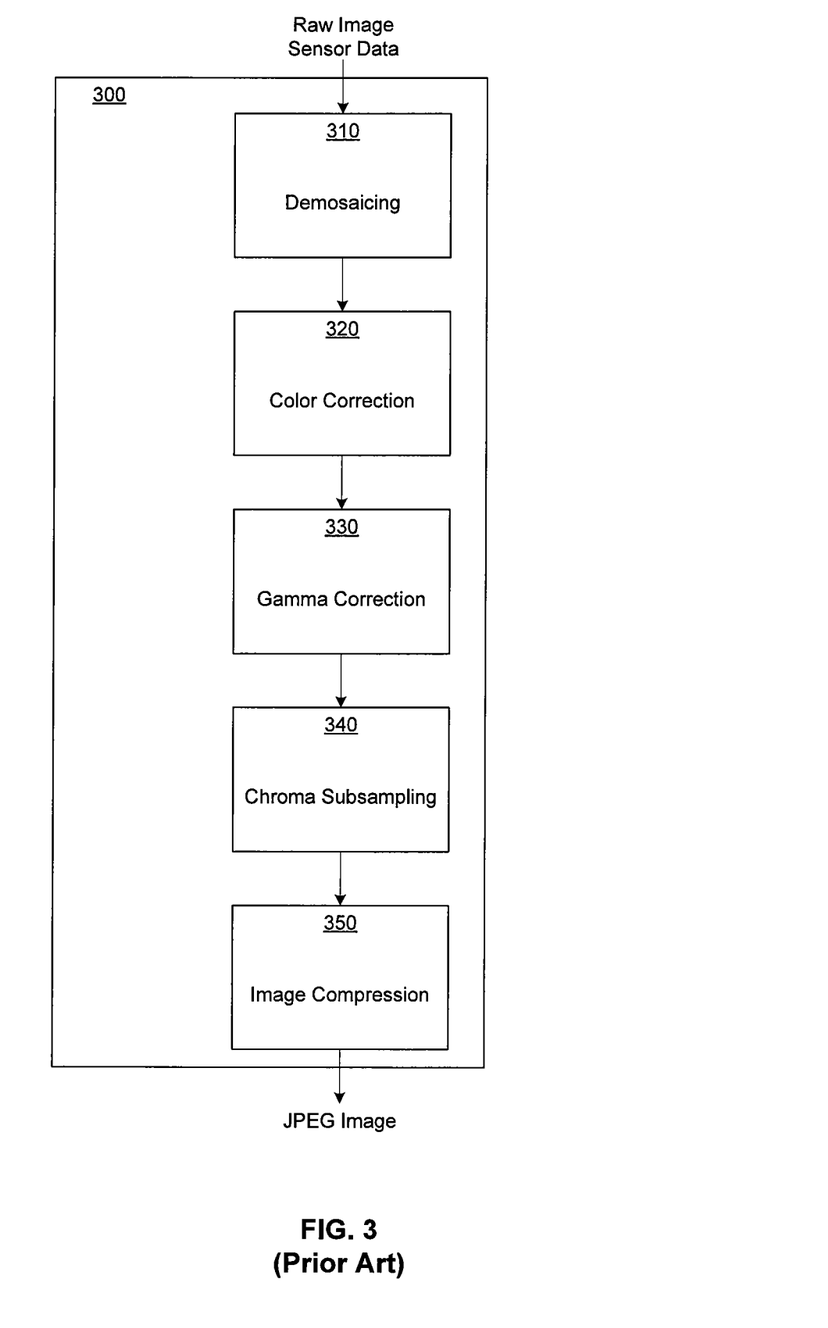
FIG. 3 illustrates a conventional digital image processing pipeline.

FIG. 3 illustrates a conventional digital image processing pipeline 300. A typical example of a digital image processing pipeline 300 includes a demosaic processing block 310, a color correction block 320, a gamma correction block 330, a chroma subsampling block 340, and a compression block 350. It will be appreciated that various digital camera manufacturers may implement different processing blocks in digital image processing pipeline 300. For example, some digital image processing pipelines may include a white balance block (not shown), which adjusts the intensities of each color channel such that the mean intensity values associated with each color channel over all pixel locations are equal.

Demosaic processing block 310 generates a digital image in an RGB format by processing the raw image sensor data 200. Many algorithms for interpolating the raw image sensor data 200 exist in the art such as nearest neighbor interpolation, bilinear interpolation, or variable gradient interpolation. In a demosaic processing block that implements nearest neighbor interpolation, the intensity value stored in each pixel location of raw image sensor data 200 is combined with intensity values from two neighboring pixel locations to generate a pixel location that includes intensity values for all three color channels. For example, the intensity value stored in pixel location 201 may be combined with the intensity values stored in pixel locations 202 and 211 to generate a single pixel location in an RGB format. In a demosaic processing block that implements bilinear interpolation, the intensity value stored in each pixel location of raw image sensor data 200 is combined with interpolated intensity values from two or more neighboring pixel locations to generate a single pixel location in an RGB format. For example, the intensity value stored in pixel location 212 is combined with the average of the intensity values stored in pixel locations 202 and 222 as well as the average of the intensity values stored in pixel locations 211 and 213 to generate a single pixel location in an RGB format.

As is well-known in the art, the demosaicing process results in a reduction in the spatial resolution of raw image sensor data 200. A pixel location of a digital image in an RGB format is associated with three intensity values corresponding to different pixel locations of raw image sensor data 200. Combining the three intensity values results in a single color at a single pixel location of the digital image. Such digital images may include image artifacts such as poorly defined edges and aliasing artifacts such as moire patterns.

Color correction block 320 is applied to the digital image in an RGB format generated by the demosaic processing block 310. The spectral response of image sensor 100 may be different than the spectral response of a human observer. The difference between the captured colors and the colors as observed by a human observer may be due to a variety of factors such as manufacturing variance in the color filter arrays as well as crosstalk. Therefore, the colors captured by image sensor 100 may be corrected by mapping the captured digital image colorspace to a standard colorspace, such as sRGB.

Conventionally, color correction block 320 is implemented by multiplying each RGB pixel location vector by a color correction matrix, as illustrated by Equation (i).

$$\begin{bmatrix} R' \\ G' \\ B' \end{bmatrix} = \begin{bmatrix} C_{RR} & C_{RG} & C_{RB} \\ C_{GR} & C_{GG} & C_{GB} \\ C_{BR} & C_{BG} & C_{BB} \end{bmatrix} \cdot \begin{bmatrix} R \\ G \\ B \end{bmatrix} \quad (i)$$

The color correction matrix coefficients are chosen to map the captured digital image colorspace to the standard colorspace. The color correction block 320 may partially correct for crosstalk by correcting for poor color separation. However, the color correction block 320 fails to correct for the reduction in spatial resolution in the raw image sensor data 200. Once the raw image sensor data 200 has been processed by demosaic processing block 310, the reduction in spatial resolution cannot be corrected.

In addition to the demosaic processing block 310 and the color correction block 320, digital image processing pipeline 300 includes a gamma correction block 330, a chroma subsampling block 340, and a compression block 350. Gamma correction block 330 adjusts the brightness of the RGB values such that the digital image, when displayed on a monitor with a non-linear brightness response, properly reproduces the true colors of the captured image. Chroma subsampling block 340 divides the three color channels into a single luminance channel and two color difference channels. Because human vision responds more to luminance than chrominance, the two color difference channels can be stored with less bandwidth than the luminance channel without reducing the overall quality of the image. Compression block 350 may take the digital image and compress it into a JPEG format or other well-known compressed image format.

The gamma correction block 330, chroma subsampling block 340, and compression block 350 are conventional processing blocks well-known in the art. As discussed above, these blocks are shown for illustrative purposes in digital image processing pipeline 300, and different processing blocks in addition to or in lieu of these processing blocks are within the scope of the invention.

Figure 4:
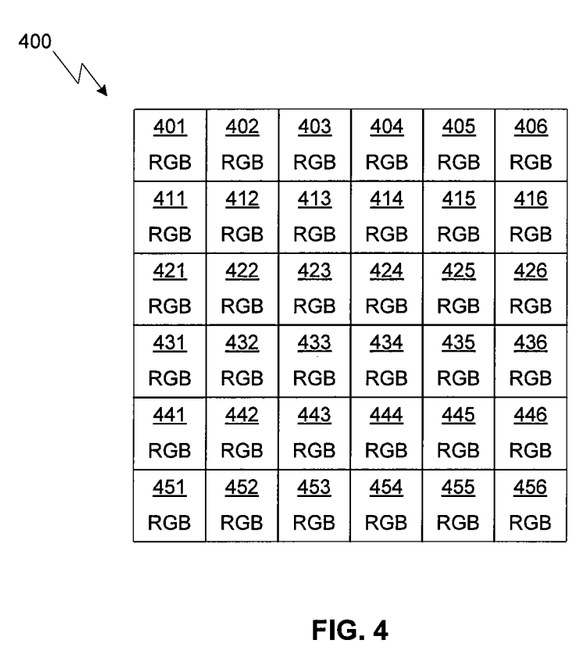
FIG. 4 illustrates a digital image in an RGB format output from the demosaic processing block of FIG. 3.

FIG. 4 illustrates a digital image 400 in an RGB format output from the demosaic processing block 310 of FIG. 3. Digital image 400 may be generated by processing raw image sensor data 200 in digital image processing pipeline 300. As shown each pixel location of digital image 400 includes an intensity value for the red color channel, the green color channel and the blue color channel. For example, in a digital image processing pipeline that implements a nearest neighbor interpolation within a demosaic processing block, pixel location 412 may include the green intensity value of pixel location 212, the red intensity value of pixel location 222, and the blue intensity value of pixel location 213. Similarly, pixel location 413 may include the blue intensity value of pixel location 213, the green intensity value of pixel location 214 and the red intensity value of pixel location 224. Pixel location 422 may include the red intensity value of pixel location 222, the green intensity value of pixel location 223, and the blue intensity value of pixel location 233. Pixel location 423 may include the green intensity value of pixel location 223, the blue intensity value of pixel location 233, and the red intensity value of pixel location 224. The other pixel locations of digital image 400 may include values from neighboring pixel locations in raw image sensor data 200 in a similar pattern to that discussed with respect to pixel locations 412, 413, 422, and 423.

Other demosaicing algorithms may be implemented such as bilinear interpolation. In bilinear interpolation, each pixel location in digital image 400 is generated using the intensity values corresponding to a 3×3 block of pixel locations in raw image sensor data 200. For example, pixel location 412 may include the green intensity value of pixel location 212, as well as the average of the red intensity values from pixel locations 202 and 222 and the average of the blue intensity values from pixel locations 211 and 213. Similarly, pixel location 413 may include the blue intensity value of pixel location 213 as well as the average of the green intensity values from pixel locations 203, 223, 212, and 214 and the average of the red intensity values from pixel locations 202, 204, 222, and 224.

Crosstalk Filter

Figure 5:
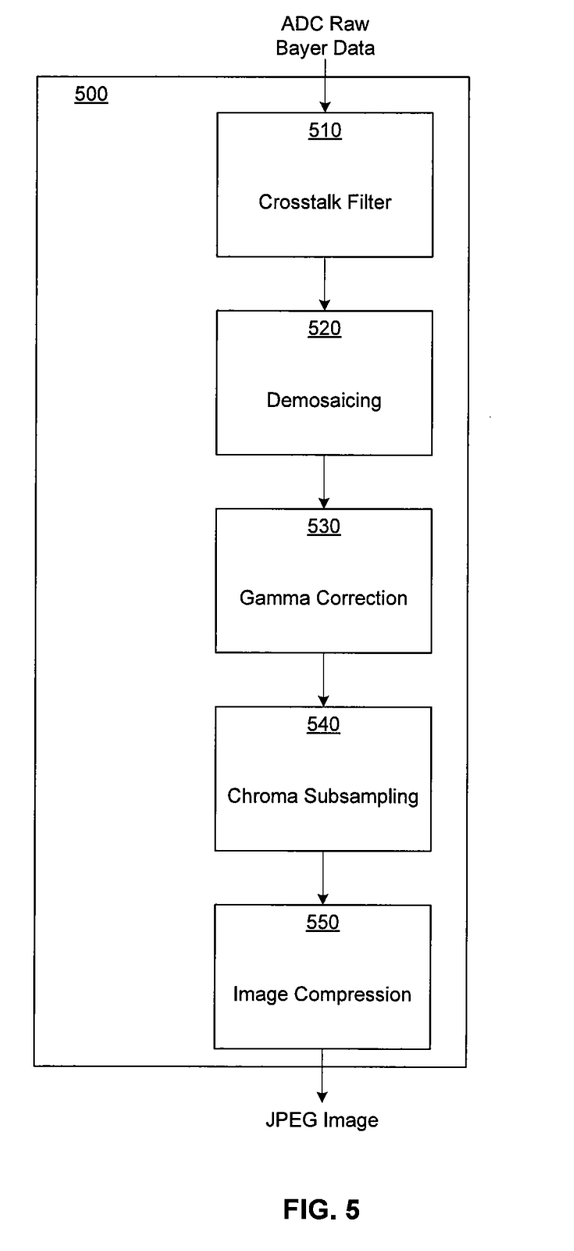
FIG. 5 illustrates a digital image processing pipeline, according to one example embodiment of the invention.

FIG. 5 illustrates a digital image processing pipeline 500, according to one example embodiment of the invention. Digital image processing pipeline 500 is similar to digital image processing pipeline 300 except that crosstalk filter processing block 510 processes the raw image sensor data 200 prior to demosaic processing block 520, and the color correction processing block 320 is not included in digital image processing pipeline 500. Crosstalk filter processing block 510 performs color correction as well as increasing the spatial resolution of the raw image sensor data 200.

Crosstalk filter processing block 510 corrects for the effects of optical and electrical crosstalk on a particular pixel location by examining the intensity values stored in neighboring pixel locations to determine a corrected intensity value substantially free of the effects of crosstalk. In order to determine the corrected intensity value, the crosstalk filter is applied to a 3×3 filter window centered on the particular pixel location.

For raw image sensor data 200 in a Bayer mosaic pattern as shown above in FIG. 2, the crosstalk filter is applied to a plurality of filter windows. The crosstalk filter applies a gain to the intensity value associated with the pixel location at the center of a filter window. Then, the crosstalk filter subtracts a fraction of the intensity values associated with neighboring pixel locations to determine a corrected intensity value for the pixel location in the center of the filter window. Coefficients that are used to weigh the effects of neighboring pixel locations may be the same as the coefficients used in the conventional color correction matrix of Equation (i). The particular details of the calculations implemented in crosstalk filter processing block 510 are described below in conjunction with FIGS. 6A-6D.

In addition, it will be appreciated that the various processing blocks of digital image processing pipeline 500 may be implemented in hardware or software. In one embodiment, crosstalk filter processing block 510 may be implemented in hardware via a programmable DSP or application specific integrated circuit (ASIC). In alternative embodiments, crosstalk filter processing block 510 may be implemented in software that is configured to perform the operations of crosstalk filter processing block 510.

Figure 6A:
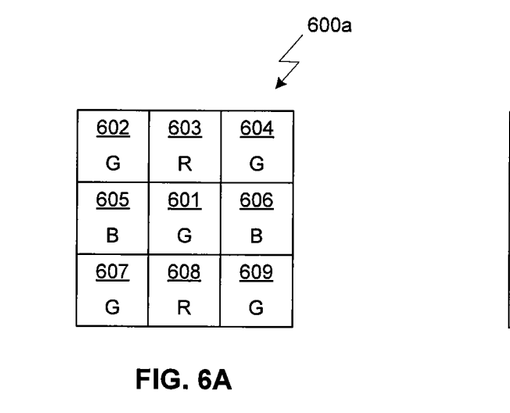
FIGS. 6A-6D illustrate different filter windows that may be implemented within the crosstalk filter processing block of FIG. 5, according to one example embodiment of the invention.

FIGS. 6A-6D illustrate different filter windows that may be implemented within the crosstalk filter processing block 510 of FIG. 5, according to one example embodiment of the invention. As shown in FIG. 6A, filter window 600a corresponds to a 3×3 filter window for pixel location 601. Pixel location 601 stores an intensity value corresponding to the green color channel and is located in a row of pixel locations that alternates between green pixel locations and blue pixel locations. In such a filter window, the corrected intensity value associated with pixel location 601 ($P'_{601}$) is calculated by taking the weighted sum of components from pixel location 601 as well as neighboring pixel locations 602 through 609, as illustrated in Equation (ii).

$$P'_{601} = C_{GG} \cdot P_{601} + C_{GR} \cdot P_{R,Filtered} + C_{GB} \cdot P_{B,Filtered} \qquad (ii)$$

$P_{R,Filtered}$ represents the filtered intensity values of neighboring red pixel locations. In one embodiment, $P_{R,Filtered}$ may be an average of intensity values of all red pixel locations in filter window 600a. For example, $P_{R,Filtered}$ may be the average of the intensity values of pixel location 603 and pixel location 608. In alternative embodiments, a larger filter window (not shown) may be applied to a plurality of pixel locations centered around pixel location 601 to calculate $P_{R,Filtered}$. For example, a gaussian filter may be applied to the intensity values of all red pixel locations in a 5×5 filter window. As is well-known in the art, a Gaussian filter weighs pixel locations in the filter window using coefficients that decay based on the distance from the center of the filter window. The decay rate is based on the standard deviation of a Gaussian curve, which may be chosen based on testing of the image sensor 100. $P_{B,Filtered}$ represents the filtered intensity values of neighboring blue pixel locations such as pixel locations 605 and 606 in filter window 600a and is calculated in a similar manner as $P_{R,Filtered}$.

The coefficients $C_{GG}$, $C_{GR}$, and $C_{GB}$ represent the filter coefficients for the green color channel (in a blue row), the red color channel, and the blue color channel, respectively. Crosstalk filter processing block 510 is implemented such that $C_{GG}$ is greater than one ($C_{GG} > 1$) and $C_{GR}$ and $C_{GB}$ are less than zero ($C_{GR}$, $C_{GB} < 0$). In addition, the sum of the coefficients is equal to one ($C_{GG} + C_{GR} + C_{GB} = 1$). In such an implementation, crosstalk filter processing block 510 essentially acts as a high pass filter (due to the sign of the respective coefficients) that enhances the spatial resolution of the raw image sensor data 200. Again, the coefficients may be the same as the coefficients of the conventional color correction matrix of Equation (i) set forth above.

Figure 6B:
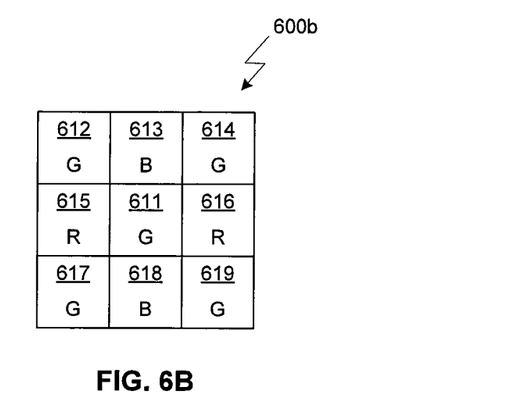

As shown in FIG. 6B, filter window 600b corresponds to a filter window for pixel location 611. Pixel location 611 stores an intensity value corresponding to the green color channel and is located in a row of pixel locations that alternates between green pixel locations and red pixel locations. In such a filter window, the corrected intensity value associated with pixel location 611 ($P'_{611}$) is calculated by taking the weighted sum of components from the pixel location 611 as well as neighboring pixel locations 612 through 619, as illustrated in Equation (iii).

$$P'_{611} = C_{GG} \cdot P_{611} + C_{GR} \cdot P_{R,Filtered} + C_{GB} \cdot P_{B,Filtered} \quad \text{(iii)}$$

Similarly to Equation (ii), $P_{R,Filtered}$ represents the filtered intensity values of neighboring red pixel locations such as pixel locations 615 and 616 and $P_{B,Filtered}$ represents the filtered intensity values of neighboring blue pixel locations such as pixel locations 613 and 618. The coefficients $C_{GG}$, $C_{GR}$, and $C_{GB}$ represent the filter coefficients for the green color channel (in a red row), the red color channel, and the blue color channel, respectively. Crosstalk filter 510 is implemented such that $C_{GG}$ is greater than one ($C_{GG}>1$) and $C_{GR}$ and $C_{GB}$ are less than zero ($C_{GR}, C_{GB}<0$). In addition, the sum of the coefficients is equal to one ($C_{GG}+C_{GR}+C_{GB}=1$).

Figure 6C:
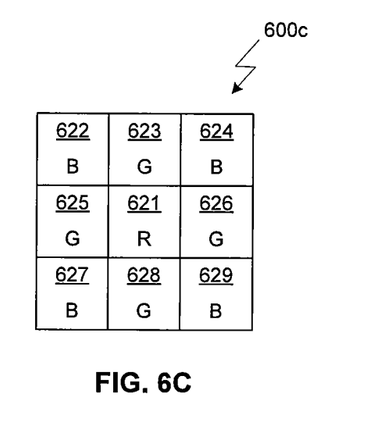

As shown in FIG. 6C, filter window 600c corresponds to a filter window for pixel location 621 (a red pixel location). In such a filter window, the corrected intensity value associated with pixel location 621 ($P'_{621}$) is calculated by taking the weighted sum of components from the pixel location 621 as well as neighboring pixel locations 622 through 629, as illustrated in Equation (iv).

$$P'_{621} = C_{RR} \cdot P_{621} + C_{RG} \cdot P_{G,Filtered} + C_{RB} \cdot P_{B,Filtered} \quad \text{(iv)}$$

$P_{G,Filtered}$ represents the filtered intensity value of neighboring green pixel locations and $P_{B,Filtered}$ represents the filtered intensity value of neighboring blue pixel locations. The coefficients $C_{RR}$, $C_{RG}$, and $C_{RB}$ represent the filter coefficients for the red color channel, the green color channel, and the blue color channel, respectively. Crosstalk filter 510 is implemented such that $C_{RR}$ is greater than one ($C_{RR}>1$) and $C_{RG}$ and $C_{RB}$ are less than zero ($C_{RG}, C_{RB}<0$). Again, the sum of the coefficients is equal to one ($C_{RR}+C_{RG}+C_{RB}=1$).

Figure 6D:
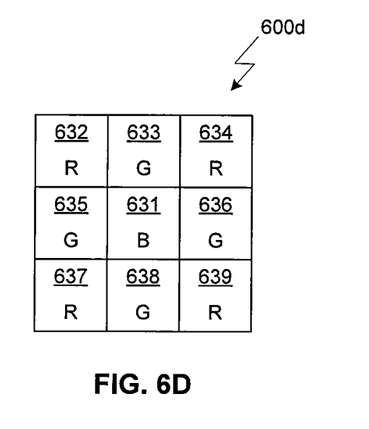

As shown in FIG. 6D, filter window 600d corresponds to a filter window for pixel location 631 (a blue pixel location). Filter window 600d is essentially the same as filter window 600c except that the blue pixel locations and red pixel locations have switched positions. Thus, the corrected value associated with pixel location 631 ($P'_{631}$) is given by Equation (v).

$$P'_{631} = C_{BB} \cdot P_{631} + C_{BG} \cdot P_{G,Filtered} + C_{BR} \cdot P_{R,Filtered} \quad \text{(v)}$$

As shown, crosstalk filter processing block 510 calculates a corrected intensity value for each pixel location of raw image sensor data 200 based on the appropriate filter window 600a-d corresponding to the particular arrangement of pixel locations in the Bayer mosaic pattern of image sensor 100.

Figure 7:
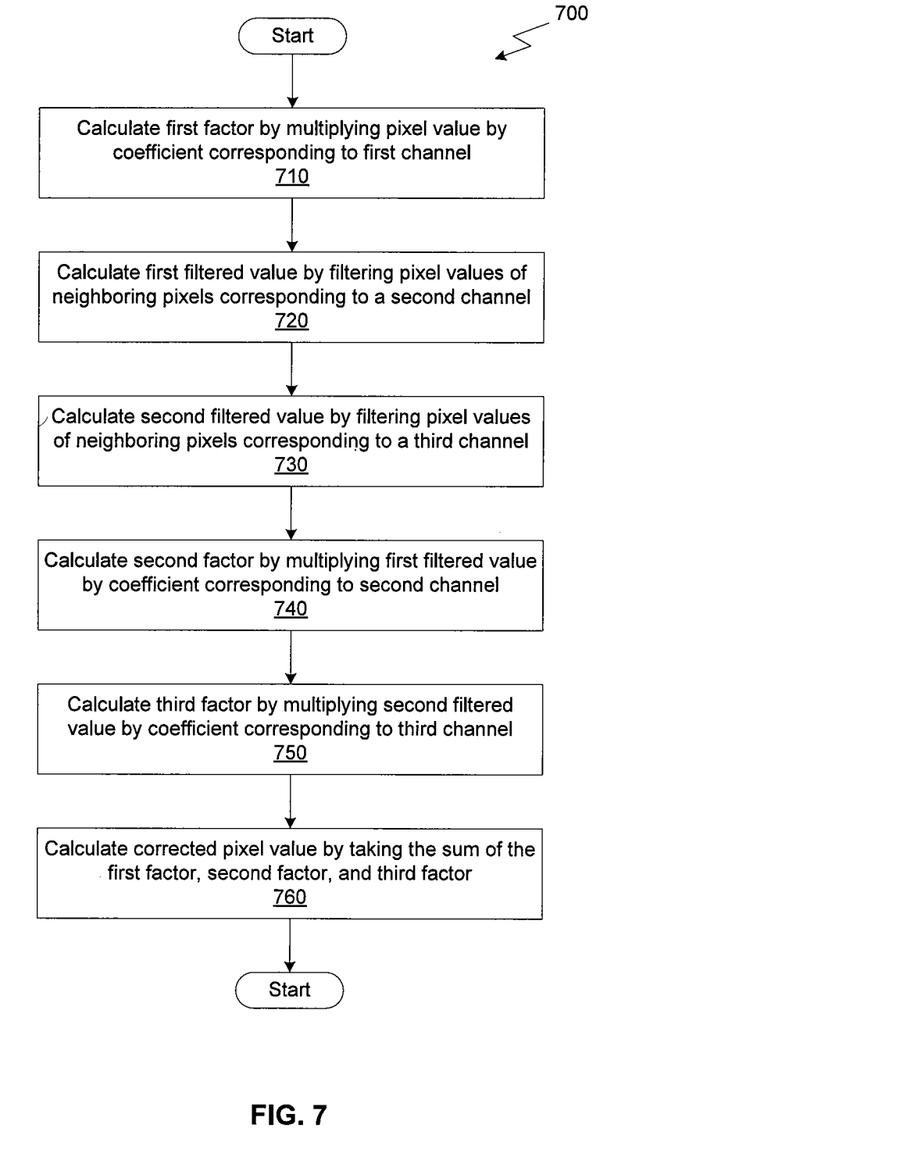
FIG. 7 is a flow diagram of method steps for processing raw image sensor data in a crosstalk filter processing block, according to one example embodiment of the invention.

FIG. 7 is a flow diagram of method steps 700 for processing raw image sensor data 200 in a crosstalk filter processing block 510, according to one example embodiment of the invention. Although the method steps are described in conjunction with the systems of FIGS. 1-6D, persons skilled in the art will understand that any system configured to perform the method steps, in any order, is within the scope of the invention.

The method 700 begins at step 710, where crosstalk filter processing block 510 processes a pixel location of raw image sensor data 200. Crosstalk filter processing block 510 computes a first factor by multiplying the intensity value associated with the pixel location by a coefficient corresponding to the color channel of that particular pixel location. At step 720, crosstalk filter processing block 510 calculates a first filtered value by applying a filter to intensity values stored in neighboring pixel locations corresponding to a second color channel. In one embodiment, the filter averages all intensity values stored in neighboring pixel locations corresponding to the second color channel. In alternative embodiments, the filter may apply a Gaussian filter to all intensity values stored in neighboring pixel locations corresponding to the second color channel. At step 730, crosstalk filter processing block 510 calculates a second filtered value by applying the filter to intensity values stored in neighboring pixel locations corresponding to a third color channel. The second filtered value is calculated in a similar manner to the first filtered value.

At step 740, crosstalk filter processing block 510 computes a second factor by multiplying the first filtered value by a coefficient corresponding to the second color channel. Similarly, at step 750, crosstalk filter processing block 510 computes a third factor by multiplying the second filtered value by a coefficient corresponding to the third color channel. Finally, at step 760, crosstalk filter processing block 510 calculates the corrected intensity value associated with the pixel location by taking a sum of the first factor, the second factor and the third factor computed in steps 710, 740, and 750, respectively.

In sum, the approach of applying a crosstalk filter to raw image sensor data disclosed above corrects for poor color separation and a reduction in spatial resolution caused by crosstalk in the image sensor. More specifically, the crosstalk filter is applied to the raw image sensor data by computing a corrected intensity value for each pixel location in the raw image sensor data. For each such pixel location, the corrected intensity value is computed by summing the weighted intensity value associated with the pixel location corresponding to a first color channel and the weighted filtered values associated with one or more neighboring pixel locations corresponding to additional color channels.

One advantage of the disclosed approach is that the crosstalk filter processing block corrects for both poor color separation and a reduction in spatial resolution before demosaicing is performed on the raw image sensor data. By correcting for crosstalk before the demosaicing process, high frequency information that is blurred between multiple pixel locations of the image sensor may be recovered. Implementing the disclosed approach in a digital image processing pipeline included in a digital camera results in higher quality digital images when compared with images processed by conventional digital image processing pipelines.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A method, comprising:
receiving an array of pixel data that is generated by an image sensor, wherein each pixel location in the array of pixel data includes an intensity value for only a single color channel of a plurality of possible color channels; and
for each pixel location in the array of pixel data:
multiplying a first coefficient corresponding to the single color channel associated with the pixel location with the intensity value associated with the pixel location to generate a first factor;
multiplying a second coefficient corresponding to a second color channel associated with at least a first of the one or more neighboring pixel locations with a first filtered value to generate a second factor, wherein the first filtered value is computed by averaging intensity values associated with all neighboring pixel locations that are associated with the second color channel;
multiplying a third coefficient corresponding to a third color channel associated with at least a second of the one or more neighboring pixel locations with a second filtered value to generate a third factor, wherein the second filtered value is computed by averaging intensity values associated with all neighboring pixel locations that are associated with the third color channel; and
summing the first factor, the second factor and the third factor to generate a corrected intensity value.

2. A method, comprising:
receiving an array of pixel data that is generated by an image sensor, wherein each pixel location in the array of pixel data includes an intensity value for only a single color channel of a plurality of possible color channels; and
for each pixel location in the array of pixel data:
multiplying a first coefficient corresponding to the single color channel associated with the pixel location with the intensity value associated with the pixel location to generate a first factor;
multiplying a second coefficient corresponding to a second color channel associated with at least a first of the one or more neighboring pixel locations with a first filtered value to generate a second factor, wherein the first filtered value is computed by applying a Gaussian filter to intensity values associated with all neighboring pixel locations that are associated with the second color channel;
multiplying a third coefficient corresponding to a third color channel associated with at least a second of the one or more neighboring pixel locations with a second filtered value to generate a third factor, wherein the second filtered value is computed by applying a Gaussian filter to intensity values associated with all neighboring pixel locations that are associated with the third color channel; and
summing the first factor, the second factor and the third factor to generate a corrected intensity value.

3. The method of claim 1, wherein the sum of the first coefficient, the second coefficient and the third coefficient equals one.

4. A method, comprising:
receiving an array of pixel data that is generated by an image sensor, wherein each pixel location in the array of pixel data includes an intensity value for only a single color channel of a plurality of possible color channels; and
for each pixel location in the array of pixel data, computing a corrected intensity value based on intensity values associated with one or more additional pixel locations that neighbor the pixel location, wherein, for a first pixel location in the array of pixel data, the corrected intensity value is computed based on an intensity value associated with the first pixel location and intensity values associated with eight neighboring pixel locations that are immediately adjacent to the first pixel location.

5. The method of claim 1, wherein the image sensor is configured to implement a color filter array in a Bayer mosaic pattern, and the plurality of possible color channels comprises a red color channel, a green color channel, and a blue color channel.

6. A non-transitory computer-readable medium including instructions that when executed by a processor cause the processor to perform an operation, the operation comprising:
receiving an array of pixel data that is generated by an image sensor, wherein each pixel location in the array of pixel data includes an intensity value for only a single color channel of a plurality of possible color channels; and
for each pixel location in the array of pixel data:
multiplying a first coefficient corresponding to the single color channel associated with the pixel location with the intensity value associated with the pixel location to generate a first factor;
multiplying a second coefficient corresponding to a second color channel associated with at least a first of the one or more neighboring pixel locations with a first filtered value to generate a second factor, wherein the first filtered value is computed by averaging intensity values associated with all neighboring pixel locations that are associated with the second color channel;
multiplying a third coefficient corresponding to a third color channel associated with at least a second of the one or more neighboring pixel locations with a second filtered value to generate a third factor, wherein the second filtered value is computed by applying a Gaussian filter to intensity values associated with all neighboring pixel locations that are associated with the third color channel; and
summing the first factor, the second factor and the third factor to generate a corrected intensity value.

7. The non-transitory computer-readable medium of claim 6, wherein the sum of the first coefficient, the second coefficient and the third coefficient equals one.

8. The non-transitory computer-readable medium of claim 6, wherein, for a first pixel location in the array of pixel data, the corrected intensity value is computed based on an intensity value associated with the first pixel location and intensity values associated with eight neighboring pixel locations that are immediately adjacent to the first pixel location.

9. The non-transitory computer-readable medium of claim 6, wherein the image sensor is configured to implement a color filter array in a Bayer mosaic pattern, and the plurality of possible color channels comprises a red color channel, a green color channel, and a blue color channel.

10. A system, comprising:
- an image sensor configured to generate an array of pixel data, wherein each pixel location in the array of pixel data includes an intensity value for only a single color channel of a plurality of possible color channels; and
- a crosstalk filter processing block that is configured to:
  receive the array of pixel data, and
  for each pixel location in the array of pixel data:
  multiply a first coefficient corresponding to the single color channel associated with the pixel location with the intensity value associated with the pixel location to generate a first factor;
  multiply a second coefficient corresponding to a second color channel associated with at least a first of the one or more neighboring pixel locations with a first filtered value to generate a second factor, wherein the first filtered value is computed by averaging intensity values associated with all neighboring pixel locations that are associated with the second color channel;
  multiply a third coefficient corresponding to a third color channel associated with at least a second of the one or more neighboring pixel locations with a second filtered value to generate a third factor, wherein the second filtered value is computed by averaging intensity values associated with all neighboring pixel locations that are associated with the third color channel; and
  sum the first factor, the second factor and the third factor to generate a corrected intensity value.

11. The system of claim 10, wherein the sum of the first coefficient, the second coefficient and the third coefficient equals one.

12. The system of claim 10, wherein, for a first pixel location in the array of pixel data, the corrected intensity value is computed based on an intensity value associated with the first pixel location and intensity values associated with eight neighboring pixel locations that are immediately adjacent to the first pixel location.

* * * * *